United States Patent
Fundberg et al.

(10) Patent No.: US 10,045,619 B2
(45) Date of Patent: Aug. 14, 2018

(54) SEQUENTIAL HOUSEHOLD EFFECTS SLIDE

(71) Applicant: INTER IKEA SYSTEMS B.V., Delft (NL)

(72) Inventors: Oskar Fundberg, Älmhult (SE); Christer Petersson, Älmhult (SE)

(73) Assignee: INTER IKEA SYSTEMS B.V., Delft (NL)

( * ) Notice: Subject to any disclaimer, the term of this patent is extended or adjusted under 35 U.S.C. 154(b) by 0 days.

(21) Appl. No.: 15/313,934

(22) PCT Filed: May 28, 2015

(86) PCT No.: PCT/EP2015/061866
§ 371 (c)(1),
(2) Date: Nov. 23, 2016

(87) PCT Pub. No.: WO2015/181305
PCT Pub. Date: Dec. 3, 2015

(65) Prior Publication Data
US 2017/0188706 A1    Jul. 6, 2017

(30) Foreign Application Priority Data

May 28, 2014 (SE) ...................................... 1450639

(51) Int. Cl.
*A47B 95/00* (2006.01)
*A47B 88/493* (2017.01)
(Continued)

(52) U.S. Cl.
CPC .......... *A47B 88/493* (2017.01); *A47B 88/473* (2017.01); *F16C 29/045* (2013.01); *A47B 2210/007* (2013.01); *F16C 2314/72* (2013.01)

(58) Field of Classification Search
CPC ..................................................... A47B 88/047
(Continued)

(56) References Cited

U.S. PATENT DOCUMENTS

| 4,696,582 A | 9/1987 | Kasten |
| 8,277,003 B2 * | 10/2012 | Milligan .............. A47B 88/493 312/334.33 |

(Continued)

FOREIGN PATENT DOCUMENTS

| DE | 202004015908 U1 | 12/2004 |
| EP | 0278960 A1 | 8/1988 |
| EP | 1647206 | * 4/2006 |

OTHER PUBLICATIONS

International Search Report PCT/EP2015/061866, dated Aug. 18, 2015.

*Primary Examiner* — Matthew W Ing
(74) *Attorney, Agent, or Firm* — Merchant & Gould P.C.

(57) ABSTRACT

A sequential slide mechanism for household effects is provided. The slide mechanism comprises a lower extension member, an upper extension member and an intermediate extension member, said extension members having a longitudinal extension, said upper extension member having a cut-out facing the lower extension member. The lower extension member and upper extension member being slidable in relation to the intermediate extension member. An extension member connector is attached to the intermediate extension member, said extension member connector having a rear end and a front end. The extension member connector comprises a main body mounted on the intermediate extension member and a head at the front end, said head being connected to the body via an elastic extension arm. The head has a top glide surface and a lower glide surface. The head is in an upper extension member locking position when the lower glide surface slides upon the cabinet slide and a part (Continued)

of the head is positioned in the cut-out. The head is in an upper extension member free-running position when said top glide surface slides upon the upper extension member.

13 Claims, 5 Drawing Sheets

(51) Int. Cl.
 *A47B 88/473* (2017.01)
 *F16C 29/04* (2006.01)
(58) Field of Classification Search
 USPC .................. 312/333, 334.44, 334.46, 334.6
 See application file for complete search history.

(56) References Cited

U.S. PATENT DOCUMENTS

| | | | | |
|---|---|---|---|---|
| 8,414,094 B2* | 4/2013 | Chi | ............... | A47B 88/493 |
| | | | | 312/333 |
| 8,590,991 B2* | 11/2013 | Radusin | ............... | A47B 88/487 |
| | | | | 312/333 |
| 2002/0081887 A1 | 6/2002 | Judge et al. | | |
| 2007/0080616 A1* | 4/2007 | Lam | ............... | A47B 88/49 |
| | | | | 312/334.6 |
| 2008/0157643 A1* | 7/2008 | Chen | ............... | A47B 88/47 |
| | | | | 312/334.6 |
| 2014/0167588 A1* | 6/2014 | Park | ............... | A47B 88/14 |
| | | | | 312/334.6 |

* cited by examiner

SEQUENTIAL HOUSEHOLD EFFECTS SLIDE

This application is a National Stage Application of PCT/EP2015/061866, filed 28 May 2015, which claims benefit of Swedish Patent Application No. 1450639-8, filed 28 May 2014 in Sweden, which applications are incorporated herein by reference. To the extent appropriate, a claim of priority is made to each of the above disclosed applications.

FIELD OF THE INVENTION

This invention pertains in general to the field of household effects slides. More particularly the invention relates to a slide mechanism comprising a lower extension member, a upper extension member and an intermediate extension member which enables the households effects slide to move the slide parts sequentially during opening and closing of the household effects.

BACKGROUND OF THE INVENTION

It is known that household effects slides with multiple slide-members generally include a slide member attached to a drawer, a slide member attached to a frame or cabinet and an intermediate slide member fitted between the two other slide members.

The movement of the slide members has got to be coordinated to make sure the members of the slide of the drawer moves in a similar manner. Uncoordinated movement can lead to shortening of the lifetime of the drawer, along with problems such as uneven friction during operation and that a large force is required to close the drawer when the slide members are out of sync.

A popular method of coordination is to have synchronized drawer slides, which have a mechanism for synchronization which ensures that the drawer slide member and cabinet slide member moves in a synchronized fashion. Such a synchronization mechanism may include cogs, chains, string or other advanced solutions, and are popular due to the very consistent luxurious feeling they provide. However, the lifetime of such slides is limited, and the mechanisms are generally complex which results in a higher manufacturing cost.

Another method of coordination is found in sequential drawer slides. In a sequential slide, only one slide member is allowed to move relative to intermediate slide member. When the drawer slide moves with respect to the intermediate slide, the cabinet slide member is locked with respect to the intermediate slide member. To allow for least wear, the drawer slide is generally locked with respect to the intermediate slide member until the intermediate slide is fully extended with respect to the cabinet slide member. This allows for the best weight distribution with relation to the rollers in the mechanism, reducing dynamic stress loading on the cabinet slide member enhancing the life of the slide. A Mechanism for sequential drawer slides is described in EP0278960, which discloses a sequential drawer slide with a shifting control lever, the lever being mounted on a pin held on arms on the intermediate slide, for sequencing movement of the slide members.

However, sequential drawer slides have never been accepted as a high quality drawer slide mechanism due to a cheaper feel when compared to more complicated systems such as synchronized drawer slides.

The reason has been problems such as failure of the sequential sequence, requiring the user to push back the drawer to its original position, difference in friction between the first and second extension step in the sequence and a friction peak or a click that can be felt mid-sequence, when a spring clip or latch or other mechanism is falling or snapping out/into place.

Hence, an improved sequential drawer slide mechanism would be advantageous; in particular one that can replace high quality drawer slides with more complex and expensive mechanisms, such as synchronized slides, allowing for the longer lifetime of a sequential drawer slide as well as better cost-effectiveness, with even friction and lack of friction peak or click that can be felt mid-sequence.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a sequential slide mechanism for household effects comprising a lower extension member, a upper extension member and an intermediate extension member, said extension members having a longitudinal extension, said upper extension member having a cut-out facing the lower extension member, wherein the lower extension member and upper extension member being slidable in relation to the intermediate extension member; an extension member connector attached to the intermediate extension member, said extension member connector having a rear end and a front end, said extension member connector comprises a main body mounted on the intermediate extension member and a head at the front end, said head being connected to the body via an elastic extension arm; and the head having a top glide surface and a lower glide surface, the head being in a upper extension member locking position when the lower glide surface slides upon the lower extension member and an upper part of the head is positioned in said cut-out to interlock relative movement in the longitudinal direction between the upper extension member and an intermediate extension member, and the head being in a upper extension member free-running position when said top glide surface slides upon the upper extension member.

Other preferred embodiments are disclosed and elucidated in the patent claims and the detailed description of the invention.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
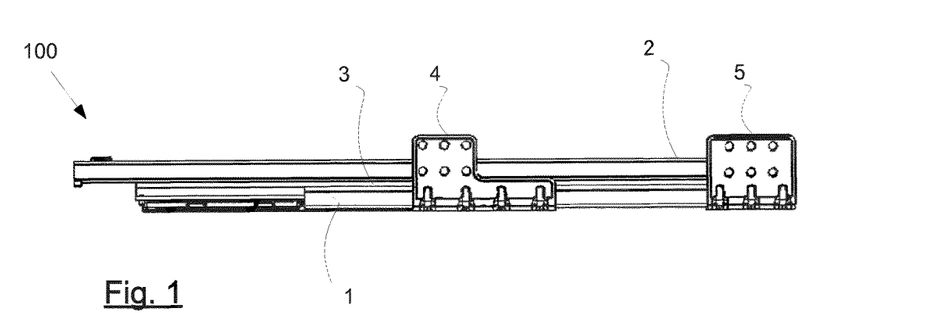
FIG. 1 is a perspective view showing a sequential slide mechanism in a closed state.
Figure 4:
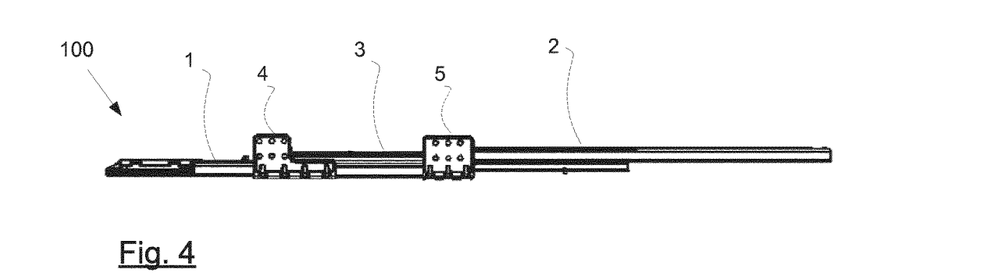
FIG. 4 is a perspective view showing a sequential slide mechanism in an extended state.

The following description of the present invention focuses on a sequential slide mechanism 100 applicable to household effects and in particular to a furniture drawer. The sequential slide comprises two extension members and an intermediate extension member 3 in order to achieve a full extension of the drawer. The extension members roll on carriages with rollers situated between the extension members and the intermediate extension member 3 to even out the load of the drawer. As seen in FIGS. 1 and 4, the extension members are here a lower extension member 1 and an upper extension member 2. The lower extension member is mounted to a cabinet frame using a rear mount 4 and a forward mount 5.

Figure 3:
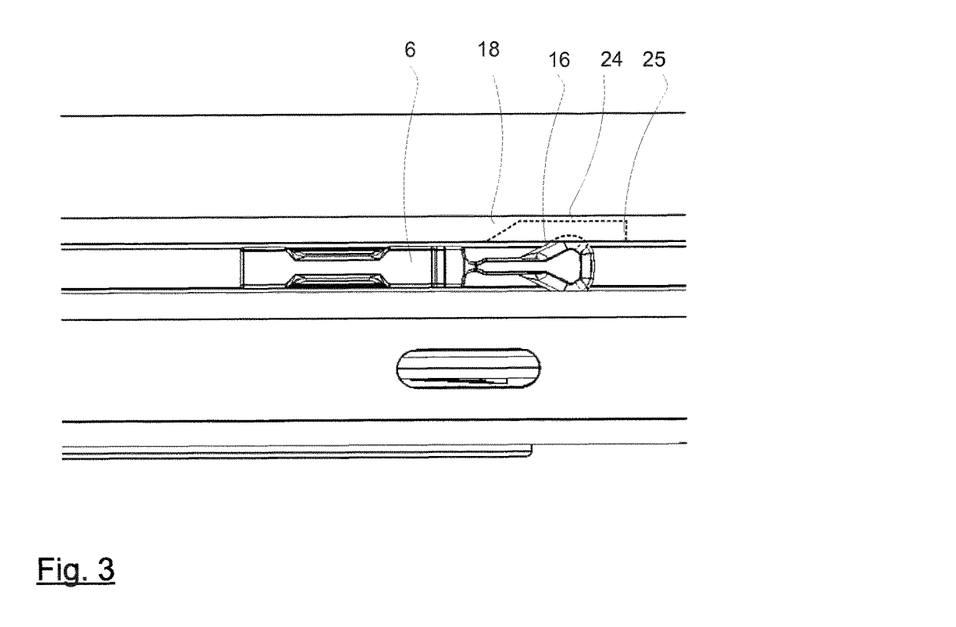
FIG. 3 is a perspective view showing part of a sequential slide mechanism in a closed state.
Figure 6:
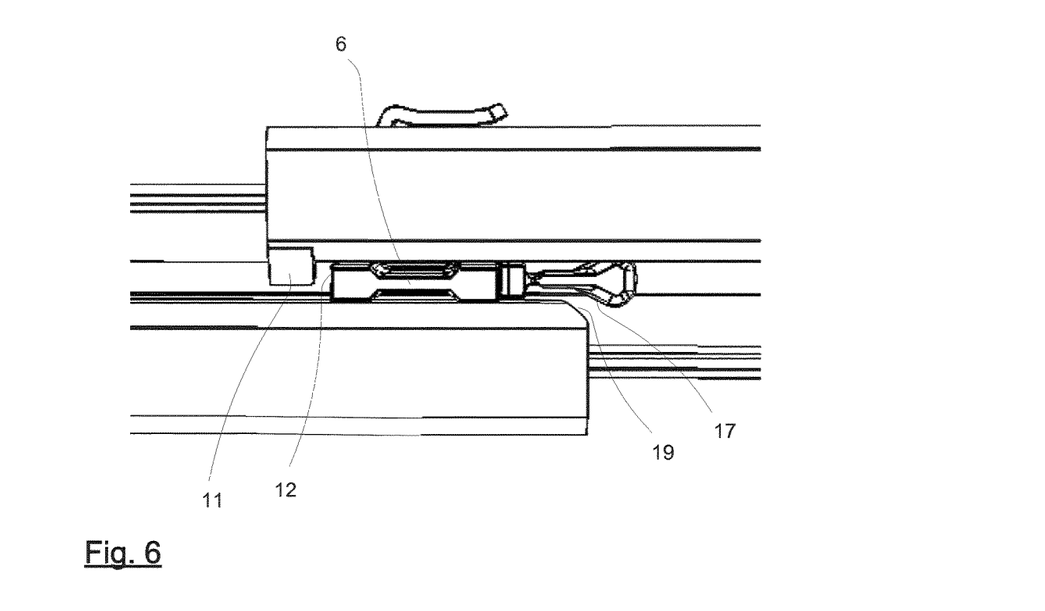
FIG. 6 is a perspective view showing part of a sequential slide mechanism in an extended state.
Figure 7:
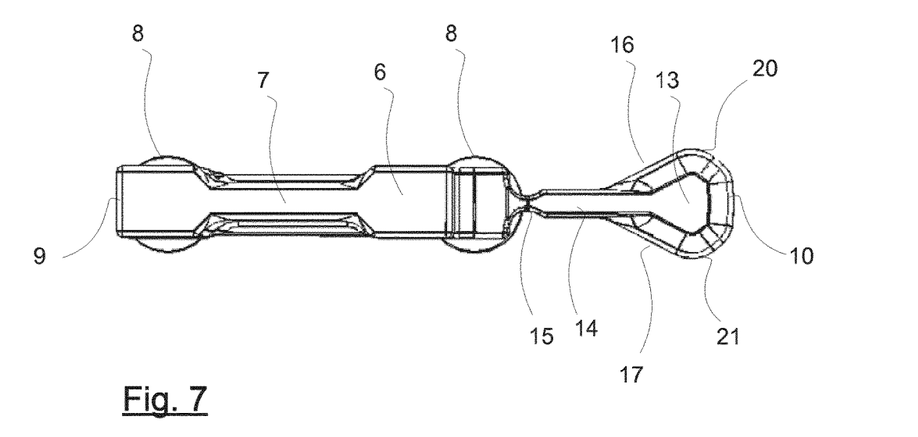
FIG. 7 is a perspective view showing an extension member connector.
Figure 8:
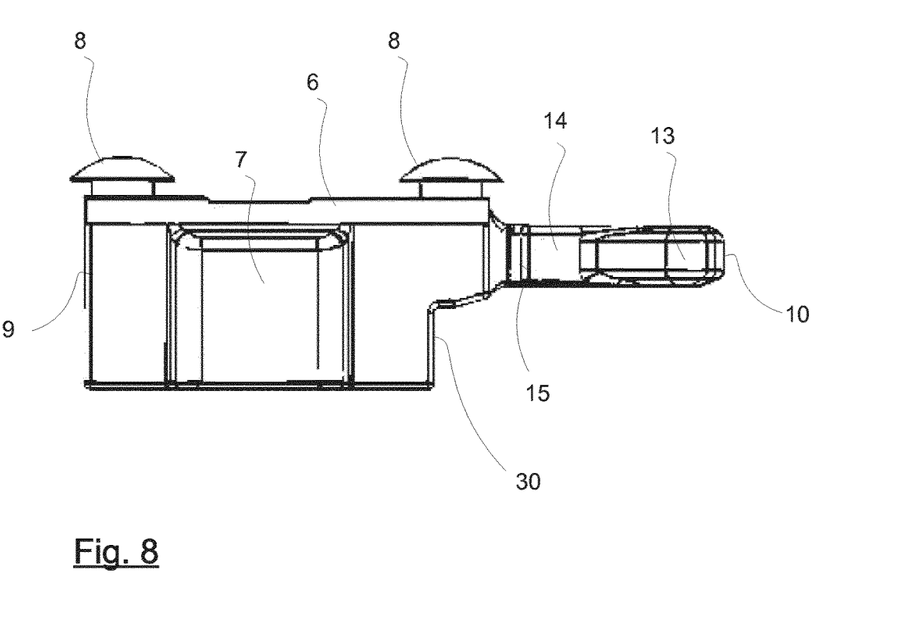
FIG. 8 is a perspective view showing a top view of the extension member connector in FIG. 7.

In order for the extension members to be sequentially extended, an extension member connector 6 is attached to the intermediate extension member 3, which can be seen in FIGS. 3 and 6. FIGS. 7 and 8 show the extension member connector 6 in detail. The extension member connector 6 has a main body 7 which is mounted on the intermediate extension member 3 at two attachment points via two attachment means 8. The attachment means 8 can be for instance pins, rivets, screws or rods. The attachment means can be an integrated part of a one piece extension member connector, or can be separately attached. The two attachment means 8 ensure firm attachment to the intermediate extension member 3 to withstand both rotational and directional forces exerted on the extension member connector 6. The rigid two point attachment ensures a long lifetime for the extension member connector 6, compared to a solution where the extension member connector 6 rotates or moves around a single attachment point.

The extension member connector 6 main body 7 may be mounted on the intermediate extension member 3 at a multitude of attachment points, such as 3, 4, 5, 6, 7 or 8 attachment points, to corresponding number of attachment means 8.

Alternatively, the extension member connector 6 main body 7 can be mounted on the intermediate extension member 3 with a single non-circular and/or elongated (such as elliptical or rectangular) shaped attachment means, connecting to a single attachment point of corresponding shape. Such an attachment means can be an integrated part of a one piece extension member connector, or can be separately attached. The non-circular and/or elongated shape of the attachment prevents the extension member connector 6 to rotate around its attachment point, enabling the extension member connector 6 to withstand both rotational and directional forces exerted on the extension member connector 6.

Figure 11:
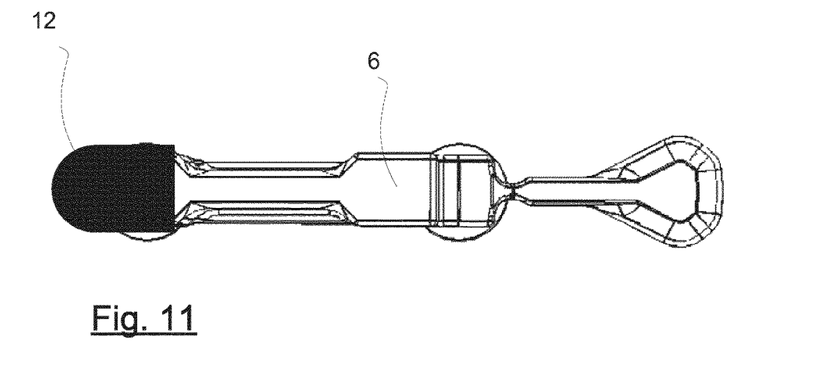
FIG. 11 is a perspective view showing an extension member connector with a rubber stopper.

The extension member connector 6 has a rear end 9 and a front end 10. The rear end 9 is preferably mounted in the direction towards the rear of the drawer cabinet. Due to the rigid construction of the extension member connector 6, the rear end 9 can be used as a stopper or shock-absorber for the upper extension member. When the drawer reaches its maximum opened position, a stopper arm 11 fixed on the upper extension member will interact with the rear end 9 of the extension member connector 6 to ensure that the upper extension member does not extend over its maximum extension length. This offers extra protection for the upper extension member as well as protecting the drawers and reducing opening noise. The rear end 9 can be fitted with a rubber stopper 12 to increase its shock-absorbing effect. The rubber stopper is an integrated part of, or mounted on, the rear end 9 of the extension member connector 6, as can be seen in FIG. 11.

Figure 12:
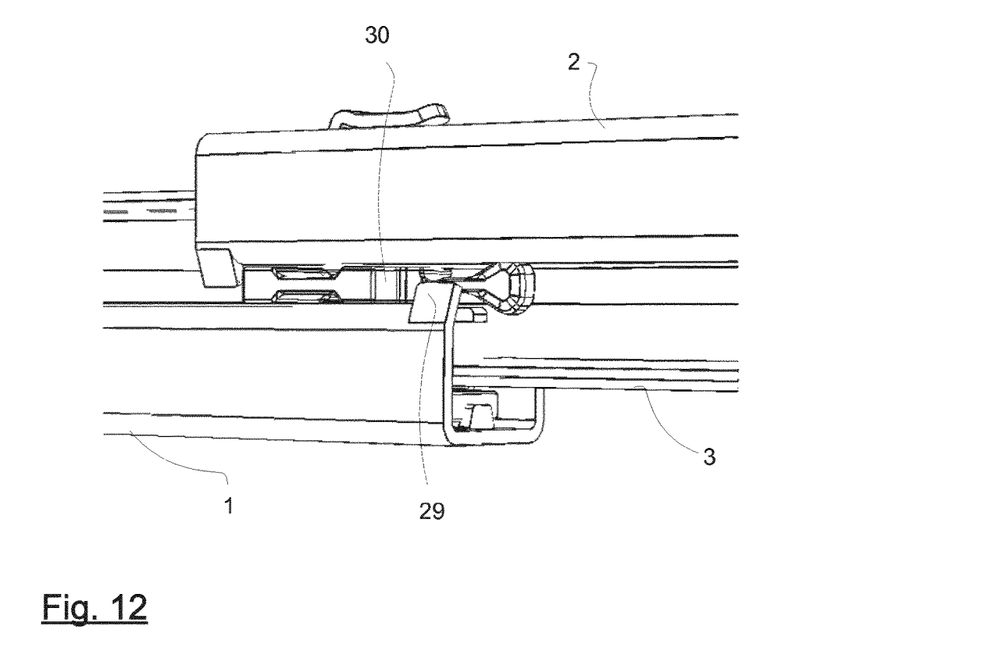
FIG. 12 is a perspective view showing part of a sequential slide mechanism in an extended state.

When the upper extension member 2 is stopped at its full extension length, excessive forward force will be transferred to the intermediate extension member 3. A stopper surface 30, as seen in FIG. 8, on the front end 10 side of the extension member connector 6 may be used as a stopper or shock-absorber for the intermediate extension member 3. A stopper arm 29 fixed on the lower extension member 1 interacts with the stopper surface 30 on the extension member connector 6, stopping the intermediate slide member 3. This ensures that excessive forward force does not push the intermediate extension member 3 past its maximum extension length, as seen in FIG. 12. This will protect the lower and intermediate extension member rollers from excessive forward forces, avoiding wear and tear and extending roller lifetime.

The front end 10 of the extension member connector 6 is here mounted towards the front of the drawer. At the front end, the extension member connector 6 has a head 13 with is fitted on an extension arm 14. The extension arm 14 is thinner than the main body 7 or the head 13 of the extension member connector 6. By varying the material and dimensions of the extension arm 14, the elastic properties can be very precisely determined. Suitable materials are fatty plastic with low a friction surface, such as fatty plastic with Teflon, but other materials such as stainless steel can also be used. Stainless steel is desirable for applications where the sequential slide mechanism 100 has to withstand heat, such as a sequential slide mechanism 100 mounted in an oven.

Optionally, the extension arm 14 has a pivot point 15. The pivot point is a short section of the extension arm 14 where the material is thinner than at the rest of the arm 14. Such a pivot point 15 can enable even better control of the elastic properties of the extension arm 14, since the extension arm 14 will bend primarily at the pivot point 15 when flexed. Furthermore, as seen in FIGS. 7 and 8, the groove or notch is aligned perpendicular to the arm extension direction and perpendicular to the intermediate extension member, defining the axis around which the extension arm will flex most easily.

The pivot point 15 may also be a short section of the extension arm 14 which is made from a different material than the rest of the extension arm 14. If said material is softer, more flexible and/or elastic material at the pivot point 15, the extension arm 14 will bend primarily at the pivot point 15 when flexed. Examples of such materials are plastic, metal or rubber, with the provision that they are softer, more flexible and/or elastic that the material of the rest of the material extension arm 14.

Alternatively, the pivot point may comprise an axis or axis swivel joint aligned perpendicular to the arm extension direction and perpendicular to the intermediate extension member. An extension arm with such a pivot point 15 formed by a rotational axis to which the extension arm is allowed to rotate would require very little force to be bent, and would not automatically bend back to its straight position unless it is combined with the elastic properties of the extension arm. Compared to an elastic extension arm 14 without a swivel point, an extension arm 14 with an axis or axis swivel joint 15 would reduce friction caused by the built up tension of the elastic arm.

The head 13 of the extension member connector 6 is located at the front end of the extension arm 14, preferably in the direction towards the front of the drawer. The head 13 is roughly shaped like a triangle with smooth corners, where the top of the triangle is connected to the extension arm 14 and the base of the triangle is the front 10 of the extension member connector 6.

The head 13 has two head transition surfaces 16, 17, one top head transition surface 16 which interacts with the upper extension member 2, and one low head transition surface 17, which interacts with the lower extension member 1. FIG. 3 shows the top head transition surface 16 and the corresponding upper extension member edge 18. FIG. 6 shows the low head transition surface 17 and the corresponding lower extension member edge 19.

The head 10 has two glide surfaces 20, 21, one top glide surface 20 which glides along the upper extension member 2, and one lower glide surface 21, which glides along lower extension member 1. The glide surfaces provide a low friction connection when interacting with the corresponding extension member.

Figure 9:
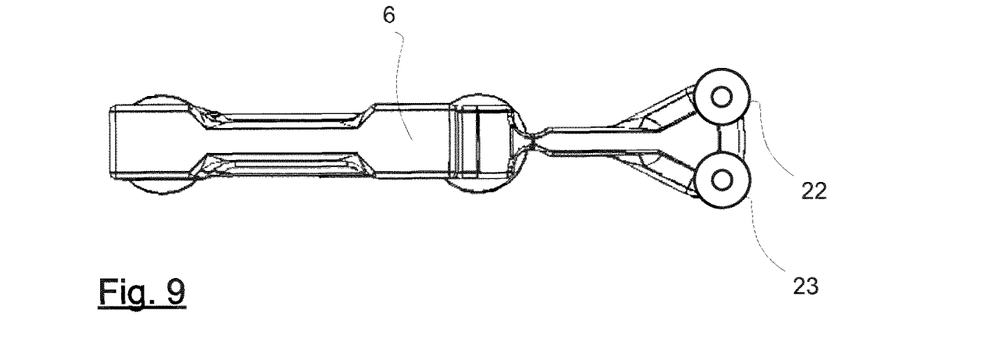
FIG. 9 is a perspective view showing an extension member connector with rollers.

Optionally, the glide surfaces 20, 21 could be rollers 22, 23 mounted on the head 13 of the extension member connector 6, as seen in FIG. 9. Such rollers 22, 23 might reduce friction between the head 13 and the corresponding extension member further. The rollers 22, 23 may also be spherical balls places at the corresponding positions of the head 10.

Figure 10:
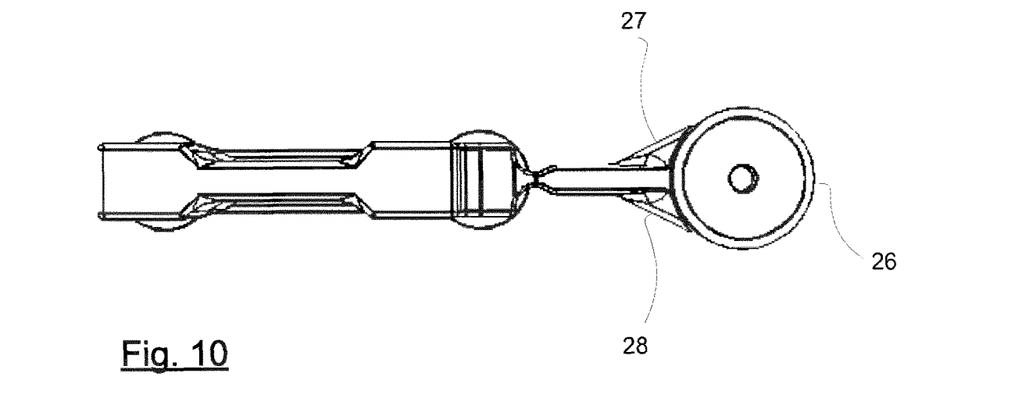
FIG. 10 is a perspective view showing an extension member connector with a single roller.

Alternatively, the head 10 can comprise a single roller 26, which provides a low friction connection between the head 10 and either the upper extension member 2 or the lower extension member 1. To prevent the roller from being locked against the upper extension member edge 18 or the lower extension member edge 19, which would prevent the single roller 26 from spinning freely, the head 10 also comprises an upper triangular protector 27 and a lower triangular protector 28. The triangular protectors act as a top head transition surface 16 and the low head transition surface 17 and will interact with the upper extension member edge 18 or the lower extension member edge 19, respectably, enabling the singe roller 26 to rotate freely.

During the sequential movement of the extension member, the head 13 of the extension member connector 6 will be forced slightly upwards or downwards. The force applied to the head 13 will be from the upper extension member 2, lower extension member 1, top head transition surface 16 or low head transition surface 17, and will result in slight bending of the extension arm 14, possible around a pivot point 15.

Figure 2:
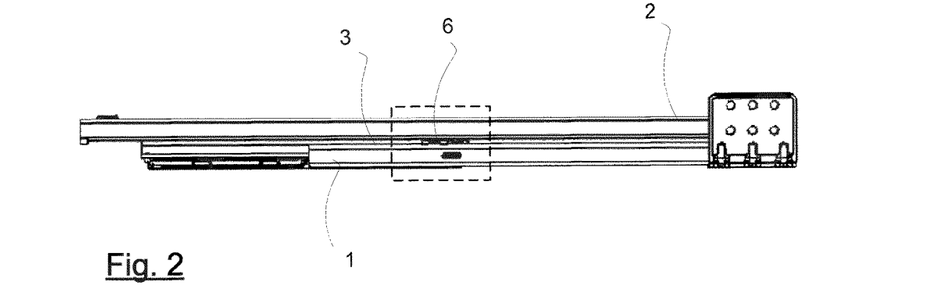
FIG. 2 is a perspective view showing part of a sequential slide mechanism in a closed state.

FIGS. 1-3 show the sequential slide 100 in the closed drawer position. In the closed position, the head 13 of the extension member connector 6 will be pushed upwards by contact between the lower extension member 1 and lower glide surface 21. This push will bend the extension arm slightly, forcing the head 13 of the extension member connector 6 up into a cut-out 24 in the upper extension member 2, into an upper extension member locking position.

When the drawer is opened, the upper extension member 2 will be pulled outwards. The upper extension member edge 18 in the cut-out 24 will make contact with the head 13 of the extension member connector 6. When the upper extension member 2 is moved further outwards, the extension member connector 6, and the intermediate extension member 3 on which is mounted, will be pulled along with the upper extension member. Thus the first sequential movement of the upper extension member from closed to open is to extend the lower extension member 1 while the upper extension member 2 and intermediate extension member 3 remains interlocked.

When the drawer being pulled outwards reaches a midpoint, the head 13 of the extension member connector 6 will reach the end of the lower extension member 1. At this point, the head 13 will reach the lower extension member edge 19 and slowly transition from the cut-out 24 position to a relaxed position, wherein the extension arm 14 is straight. As the upper extension member 2 continues to move outwards, the upper extension member edge 18 will start to push the head 13 of the extension member connector 6 downwards by contact between the upper extension member edge 18 and the head 13 until the extension member connector 6 has transitioned to an upper extension member free-running position.

Figure 5:
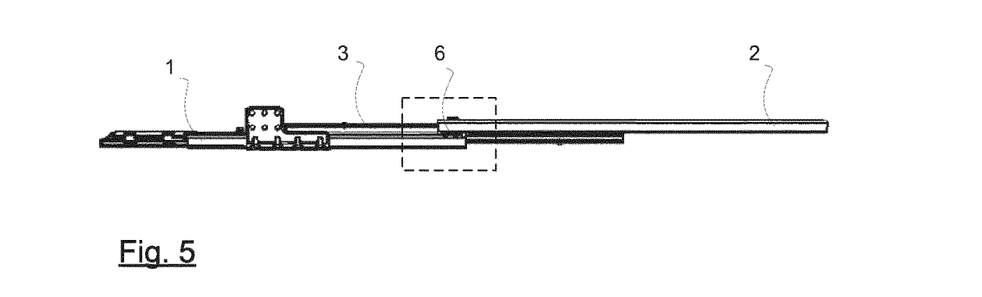
FIG. 5 is a perspective view showing part of a sequential slide mechanism in an extended state.

The upper extension member can now run freely, and the head 13 of the extension member connector 6 will be pushed downwards by contact between the upper extension member 2 and upper glide surface 20. This push will bend the extension arm slightly, keeping the head 13 of the extension member connector 6 in its upper extension member free-running position until the upper extension member mechanism is fully extended. FIGS. 4-6 show the sequential extension member mechanism at an almost fully extended position.

When the drawer reaches its maximum opened position, a stopper arm 11 fixed on the upper extension member 2 will interact with the rear end 9 of the extension member connector 6 to ensure that the upper extension member 2 does not extend over its maximum extension length.

When the drawer is being closed the sequence will repeat itself in the reversed order. When a fully opened drawer begins to close, the upper extension member 2 runs freely, while the head 13 of the extension member connector 6 is pushed downwards by contact between the upper extension member 2 and upper glide surface 20 of the head 13. This push will bend the extension arm 14 slightly, keeping the head 13 of the extension member connector 6 in its upper extension member free-running position where it will lock against the lower extension member edge 19 until the upper extension member 2 reaches the midpoint.

At this point, the cut-out 24 on the upper extension member 2 will reach the head 13 in its upper extension member free-running position, enabling the head 13 to slowly transition from the upper extension member free-running position to a relaxed position, wherein the extension arm 14 is straight. As the upper extension member 2 reaches its fully contracted position, the intermediate arm 3 will start to move backwards, and the lower extension member edge 19 will start to push the head 13 of the extension member connector 6 upwards through contact between the lower extension member edge 19 and the head 13 until the extension member connector 6 has transitioned to the upper extension member locking position. This will bend the extension arm 14 slightly, keeping the head 13 of the extension member connector 6 in its upper extension member locking position where it will lock against the upper extension member edge 21 until the drawer reaches its fully closed position. FIG. 1 shows the sequential slide mechanism at an almost fully contracted position.

The force required to open the drawer will thus be constant. The friction drag of the head 13 of the extension member connector 6 to the upper extension member 2 equals to the friction drag of the head 13 of the extension member connector 6 against the lower extension member 1. Similarly, the force required to close the drawer will be constant. The friction drag of the head 13 of the extension member connector to the upper extension member 2 equals to the friction drag of the head 13 of the extension member connector 6 against the lower extension member 1.

Furthermore, during the transition from cut-out 24 to upper extension member free-running position, the angle of the upper glide surface and lower glide surfaces are the same, as well as the angle of the lower extension member transition surface 19 and upper extension member transition surface 18. Thus this transition will be very similar to that of the friction drag of the head of the extension member connector against the lower extension member or the upper extension member. Thus, this transition will hardly be noticeable to the user.

Thus, the drawer can extend sequentially, but with the feel of extending linearly.

The invention can be implemented in any suitable form, however the invention is preferably implemented as a sequential slide for of household effects, such as for furniture drawers. The elements and components of an embodiment of the invention may be physically, functionally and logically implemented in any suitable way. Indeed, the functionality may be implemented in a single unit, in a plurality of units or as part of other functional units.

The present invention is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A sequential slide mechanism for household effects comprising a lower extension member, a upper extension member and an intermediate extension member, said extension members having a longitudinal extension, said upper extension member having a cut-out facing the lower extension member, wherein:
   the lower extension member and upper extension member being slidable in relation to the intermediate extension member;
   an extension member connector attached to the intermediate extension member, said extension member connector having a rear end and a front end, said extension member connector comprises a main body mounted on the intermediate extension member and a head at the front end, said head being connected to the body via an elastic extension arm; and
   the head having a top glide surface and a lower glide surface, the head being in an upper extension member locking position when the lower glide surface slides upon the cabinet slide and an upper part of the head is positioned in said cut-out to interlock relative movement in the longitudinal direction between the upper extension member and an intermediate extension member, and the head being in an upper extension member free-running position when said top glide surface slides upon the upper extension member, wherein during the sequential movement of the extension members, the head of the extension member connector is forced upwards or downwards resulting in a bending of the elastic extension arm.

2. A sequential slide mechanism according to claim 1, wherein at an intermediate point, the head of the extension member connector will transition between the upper extension member free-running position and the upper extension member locking position by being gradually forced upwards by contact between a lower extension member edge and the lower glide surface, into a cut-out in the upper extension member, or transition between the upper extension member locking position and the lower extension member free-running position by being gradually pushed downwards by contact between a upper extension member edge and upper glide surface.

3. A sequential slide mechanism according to claim 1, wherein the upper extension member is locked to the intermediate extension member when the head of the extension member connector is in the upper extension member locking position, and the lower extension member is locked to the intermediate slide when the head of the extension member connector is in the upper extension member free-running position.

4. A sequential slide mechanism according to claim 1, wherein the extension arm has a pivot point, wherein said pivot point may comprise;
   an axis or axis swivel joint aligned perpendicular to the arm extension direction and perpendicular to the intermediate extension member; or
   a groove or notch aligned perpendicular to the arm extension direction and perpendicular to the intermediate extension member as a short section of the extension arm, where the material is thinner than for the rest of the extension arm;
   a section of the extension arm aligned perpendicular to the arm extension direction and perpendicular to the intermediate extension member, made from a material that differs from the rest of the extension arm, where said material is softer, more flexible or more than the material of the rest of the extension arm;
   where the pivot point allows for better control of the elastic properties of the extension arm since the extension arm will bend primarily at the pivot point when flexed.

5. A sequential slide mechanism according to claim 1, wherein the material of the a extension member connector is an elastic low friction material selected from the group containing fatty plastic with low a friction surface, fatty plastic with Teflon and stainless steel.

6. A sequential slide mechanism according to claim 1, wherein the glide surfaces are rollers or spherical balls mounted on the head of the extension member connector, reducing friction between the head and the corresponding extension member.

7. A sequential slide mechanism according to claim 1, wherein the head of the extension member connector comprises;
   a single roller, reducing friction between the head and the corresponding extension member;

an upper triangular protector, which acts as a top head transition surface when interacting with the upper extension member edge, enabling the single roller to roll freely upper extension member locking position; and a lower triangular protector, which acts as a low head transition surface when interacting with lower extension member edge, enabling the single roller to roll freely upper extension member free-running position.

8. A sequential slide mechanism according to claim 1, wherein the extension member connector is attached to the intermediate extension member at;

at least two attachment points;

at a multitude of attachment points; or at single attachment point, using a non-circular and/or elongated shaped attachment means.

9. A sequential slide mechanism according to claim 1, wherein the rear end of the extension member connector can be used as a stopper or shock-absorber for the upper extension member, by a stopper arm fixed on the upper extension member interacting with the rear end of the extension member connector to ensure that the upper extension member does not extend over its maximum extension length.

10. A sequential slide mechanism according to claim 1, wherein a stopper surface on the extension member connector can be used as a stopper or shock-absorber for the intermediate extension member, by a stopper arm fixed on the lower extension member interacting with the stopper surface on the extension member connector to ensure that the intermediate extension member does not extend over its maximum extension length.

11. A sequential slide mechanism according to claim 8, wherein the extension member connector is attached to the intermediate extension member at 3, 4, 5, 6, 7, or 8 attachment points.

12. A sequential slide mechanism according to claim 8, wherein the extension member connector is attached to the intermediate extension member at a single attachment point using an elliptical shaped attachment means.

13. A sequential slide mechanism according to claim 8, wherein the extension member connector is attached to the intermediate extension member at a single attachment point using a rectangular shaped attachment means.

* * * * *